(12) United States Patent
Adachi et al.

(10) Patent No.: US 8,034,877 B2
(45) Date of Patent: Oct. 11, 2011

(54) AQUEOUS INTERMEDIATE COATING COMPOSITION AND METHOD FOR FORMING MULTILAYER COATING FILM

(75) Inventors: Takato Adachi, Kanagawa (JP); Satoru Furusawa, Kanagawa (JP); Shingo Sato, Kanagawa (JP); Terutaka Takahashi, Kanagawa (JP)

(73) Assignee: Kansai Paint Co., Ltd., Amagasaki-shi (JP)

( * ) Notice: Subject to any disclaimer, the term of this patent is extended or adjusted under 35 U.S.C. 154(b) by 707 days.

(21) Appl. No.: 12/161,716

(22) PCT Filed: Jan. 23, 2007

(86) PCT No.: PCT/JP2007/050960
§ 371 (c)(1),
(2), (4) Date: Jul. 22, 2008

(87) PCT Pub. No.: WO2007/083803
PCT Pub. Date: Jul. 26, 2007

(65) Prior Publication Data
US 2010/0221442 A1    Sep. 2, 2010

(30) Foreign Application Priority Data

Jan. 23, 2006 (JP) ................................. 2006-014072

(51) Int. Cl.
| B05D 1/38 | (2006.01) |
| B05D 3/02 | (2006.01) |
| C08K 7/00 | (2006.01) |
| C08L 33/02 | (2006.01) |
| C08L 67/02 | (2006.01) |
| C08L 67/03 | (2006.01) |

(52) U.S. Cl. ................... 525/124; 427/385.5; 427/388.4; 427/409; 525/162

(58) Field of Classification Search .................... None
See application file for complete search history.

(56) References Cited

U.S. PATENT DOCUMENTS

| 6,177,488 B1 * | 1/2001 | Kasari et al. .................. 523/410 |
| 2004/0228974 A1 * | 11/2004 | Yamane et al. ............. 427/372.2 |
| 2007/0237903 A1 * | 10/2007 | Hiwara et al. ............. 427/407.1 |

FOREIGN PATENT DOCUMENTS

| JP | 10-231454 | | 9/1998 |
| JP | 2002-38104 A1 | | 2/2002 |
| JP | 2002-155236 | | 5/2002 |
| JP | 2002-254024 A1 | | 9/2002 |
| JP | 2002-294148 A1 | | 10/2002 |
| JP | 2003-20441 A | * | 1/2003 |
| JP | 2003-20441 A1 | | 1/2003 |
| JP | 2003-105257 A1 | | 4/2003 |

* cited by examiner

*Primary Examiner* — Robert Sellers
(74) *Attorney, Agent, or Firm* — Kratz, Quintos & Hanson, LLP

(57) ABSTRACT

The present invention provides an aqueous intermediate coating composition comprising:
(A) a resin containing hydroxyl and carboxyl groups with a hydroxyl value of 100 to 200 mg KOH/g and an acid value of 20 to 50 mg KOH/g;
(B) at least one curing agent selected from the group consisting of melamine resins and blocked polyisocyanate compounds; and
(C) flat pigment particles;
the molecular weight distribution of a curable resin component comprising component (A) and component (B) including from 30 to 50% by weight of a component with a molecular weight of less than 1,000, and 10% by weight or less of a component with a molecular weight exceeding 100,000;
the proportion of component (C) being from 2 to 15 parts by weight based on 100 parts by weight of the resin component; and
when the intermediate coating composition is applied to an undercoating film, pre-dried at 100° C. for 30 minutes and then heat-cured at 145° C. for 30 minutes, the film thickness shrinkage percentage of the cured coating film being 20% or less based on the film thickness of the coating film after pre-drying.

The invention also provides a method for forming a multilayer coating film using the aqueous intermediate coating composition.

13 Claims, No Drawings

AQUEOUS INTERMEDIATE COATING COMPOSITION AND METHOD FOR FORMING MULTILAYER COATING FILM

TECHNICAL FIELD

The present invention relates to an aqueous intermediate coating composition and a method for forming a multilayer coating film using the aqueous intermediate coating composition.

BACKGROUND ART

In recent years, environmental problems have become an issue of great concern on a global scale. In the automotive industry, environmental protection measures have been actively promoted in manufacturing processes. In automotive manufacturing processes, reducing the amount of released volatile organic compounds (VOC) has become a particularly urgent task.

The outer panels, etc., of automobile bodies are usually coated with a multilayer coating film comprising an undercoating film, an intermediate coating film and a topcoating film to impart corrosion resistance and a beautiful appearance. Of these coats, the undercoating film is formed by applying an aqueous coating composition such as a cationic electrodeposition coating composition, etc. To reduce the amount of VOCs, the use of aqueous intermediate and top coating compositions for forming intermediate and top coating films, respectively, has been actively promoted.

An aqueous intermediate coating composition is required to form a coating film with excellent smoothness, masking slight unevenness on the surface of an undercoating film such as an electrodeposition coating film, etc. An intermediate coating film is usually formed by applying an intermediate coating composition on an undercoating film, and subsequently conducting the steps of pre-drying and curing by heating. The pre-drying step volatilizes and dries out a medium such as water, an organic solvent, etc., contained in a composition. The step of curing by heating first uses heat to melt a deposited coating composition to allow it to flow, followed by a curing reaction to obtain a cured coating film.

Japanese Unexamined Patent Publication No. 2002-294148 proposes, as an aqueous intermediate coating composition that exhibits good background hiding properties, an aqueous intermediate coating composition comprising a polyester resin containing carboxyl groups and an alkyl-etherified melamine resin whose mononuclear triazine content is 50% by weight or more, and whose degree of polymerization is 2.5 or less. However, since this aqueous intermediate coating composition does not exhibit sufficient heat flow properties for a deposited coating film, the background hiding properties are reduced, resulting in the formation of a coating film with unsatisfactory smoothness.

In order to solve the above-described problems, Japanese Unexamined Patent Publication No. 2003-105257 discloses an intermediate coating composition of a similar component composition, in which the hiding properties are improved by reducing the viscosity of the deposited coating composition, and delaying the curing initiation time to obtain better heat flow properties. However, even with this coating composition, satisfactory background hiding properties, and by extension, a smoother surface, cannot be obtained in the coating film.

DISCLOSURE OF THE INVENTION

Problem to Be Solved by the Invention

The object of the invention is to provide an aqueous intermediate coating composition that exhibits excellent background hiding properties and imparts excellent performance, such as smoothness and the like, to the coating film, and a method for forming a multilayer coating film using the aqueous intermediate coating composition.

Means for Solving the Problem

The present inventors conducted extensive research to achieve the above-described object. As a result, the inventors found that the object can be achieved by controlling the molecular weight distribution of the curable resin component of an aqueous intermediate coating composition within a specific range; by using a specific amount of flat pigment particles; and by controlling the film thickness shrinkage percentage of the cured coating film based on the coating film after the pre-drying step to a specific value or less. The invention was accomplished based on this new finding.

The invention provides aqueous intermediate coating compositions and a method for forming a multilayer coating film using the coating compositions as summarized below.

1. An aqueous intermediate coating composition comprising:
   (A) a resin containing hydroxyl and carboxyl groups with a hydroxyl value of 100 to 200 mg KOH/g and an acid value of 20 to 50 mg KOH/g;
   (B) at least one curing agent selected from the group consisting of melamine resins and blocked polyisocyanate compounds; and
   (C) flat pigment particles;
   the molecular weight distribution of a curable resin component comprising component (A) and component (B) including from 30 to 50% by weight of a component with a molecular weight of less than 1,000, and 10% by weight or less of a component with a molecular weight exceeding 100,000;
   the proportion of component (C) being from 2 to 15 parts by weight based on 100 parts by weight of the curable resin component; and
   when the intermediate coating composition is applied to an undercoating film, pre-dried at 100° C. for 30 minutes and then heat-cured at 145° C. for 30 minutes, the film thickness shrinkage percentage of the cured coating film being 20% or less based on the film thickness of the coating film after pre-drying.
2. An aqueous intermediate coating composition according to Item 1, wherein the resin containing hydroxyl and carboxyl groups (A) is at least one resin selected from the group consisting of polyester resins containing hydroxyl and carboxyl groups and acrylic resins containing hydroxyl and carboxyl groups.
3. An aqueous intermediate coating composition according to Item 1, wherein the curing agent (B) is a mixture of a melamine resin and a blocked polyisocyanate compound.
4. An aqueous intermediate coating composition according to Item 1, wherein the curing agent (B) is a methyl-butyl mixed etherified melamine resin having a mononuclear triazine content of 35% by weight or more, and having a methoxy/butoxy molar ratio of from 100/0 to 60/40 mol %.

5. An aqueous intermediate coating composition according to Item 1, wherein the proportion of the resin containing hydroxyl and carboxyl groups (A) is from 80 to 65% by weight, and the proportion of the curing agent (B) is from 20 to 35% by weight, based on 100% by weight of the total solids content of both components.
6. An aqueous intermediate coating composition according to Item 1, further comprising, as a curable resin component, a urethane-modified polyester resin (D) with both hydroxyl and blocked isocynate groups per molecule.
7. An aqueous intermediate coating composition according to Item 6, wherein the total blocked isocyanate group content of the curing agent (B), which is a blocked polyisocyanate compound, and the urethane-modified polyester resin (D) with both hydroxyl and blocked isocynate groups per molecule is from 0.02 to 0.8 mmol/g based on the total content of the curable resin component.
8. An aqueous intermediate coating composition according to Item 6, wherein the proportion of the resin containing hydroxyl and carboxyl groups (A) and urethane-modified polyester resin (D) is from 85 to 60% by weight, and the proportion of the curing agent (B) is from 15 to 40% by weight, based on 100% by weight of the total solids content of components (A) and (D) as well as component (D).
9. An aqueous intermediate coating composition according to Item 1, further comprising crosslinked resin particles (E) with an average particle size of 150 nm or less.
10. An aqueous intermediate coating composition according to Item 9, wherein the proportion of the crosslinked resin particles (E) is from 1 to 10 parts by weight based on 100 parts by weight of the curable resin component.
11. An aqueous intermediate coating composition according to Item 1, further comprising a pigment not in the form of flat pigment particles.
12. A method for forming a multilayer coating film by forming on a substrate an undercoating film, an intermediate coating film, and a topcoating film, the intermediate coating film being formed using the aqueous intermediate coating composition defined in Item 1.
13. A method according to Item 12, wherein the substrate is an automobile body.

Aqueous Intermediate Coating Composition

The aqueous intermediate coating composition of the invention is an aqueous intermediate coating composition comprising a resin containing hydroxyl and carboxyl groups (A) with a specific hydroxyl value and acid value; at least one curing agent (B) selected from melamine resins and blocked polyisocyanate compounds; and a specific amount of flat pigment particles (C).

Notable features of the aqueous intermediate coating composition of the invention are that the molecular weight distribution of the curable resin component comprising component (A) and component (B) is within a specific range, and the film thickness shrinkage percentage of the coating film due to heat-curing is not more than a specific value.

Molecular Weight Distribution of Curable Resin Component

The coating composition of the invention comprises, as a curable resin component, a resin containing hydroxyl and carboxyl groups (A) and at least one curing agent (B) selected from melamine resins and blocked polyisocyanate compounds. The coating composition may further comprise, as a curable resin component, a urethane-modified polyester resin (D) with both hydroxyl and blocked isocynate groups per molecule, as needed.

The term "curable resin component" herein means the resin component involved in the curing reaction of the coating composition.

The molecular weight distribution of the curable resin component must include from about 30 to 50% by weight of a component with a molecular weight of less than 1,000, and 10% by weight or less of a component with a molecular weight exceeding 100,000. If the content of a component with a molecular weight of less than 1,000 is less than 30% by weight, sufficient heat flow properties cannot be obtained, resulting in a lower smoothness of the coating film. If the content of the component with a molecular weight of less than 1,000 exceeds 50% by weight, the film performance, such as water resistance, chipping resistance, etc., may deteriorate. On the other hand, if the content of the component with a molecular weight exceeding 100,000 is 10% by weight or more, sufficient heat flow properties cannot be obtained, resulting in a lower smoothness of the coating film.

Preferably, the molecular weight distribution of the curable resin component of the coating composition includes from about 35 to about 47% by weight of a component with a molecular weight of less than 1,000. The molecular weight distribution of the curable resin component also preferably includes less than 9% by weight of a component with a molecular weight exceeding 100,000.

In the invention, the molecular weight distribution of the curable resin component is the distribution of the molecular weight of the resin component calculated based on the molecular weight of polystyrene, using gel permeation chromatography (GPC).

The molecular weight distribution can be determined, for example, as follows. The coating composition of the invention is dissolved in THF (tetrahydrofuran) and centrifuged to separate the curable resin component from other components such as the pigment particles (C), and the supernatant is filtered for use as a sample. Using this sample, the molecular weight of the resin component measured by gel permeation chromatography is calculated based on the molecular weight of polystyrene to determine the molecular weight distribution. More specifically, using the commercially available product "HLC8120GPC" (trade name, from Tosoh Corporation) as a gel permeation chromatograph, and using the four commercially available columns, "TSKgel G-4000HXL", "TSKgel G-3000HXL", "TSKgel G-2500HXL", and "TSKgel G-2000HXL" (trade names, all from Tosoh Corporation) as columns, the molecular weight can be measured under the following conditions: mobile phase: tetrahydrofuran; measurement temperature: 40° C.; flow rate: 1 cc/min.; and detector: RI. The content by weight of the component with a molecular weight of less than 1,000 and the content by weight of the component with a molecular weight exceeding 100,000 are calculated from the molecular weight distribution thus measured.

Film Thickness Shrinkage Percentage of the Coating Composition

When the intermediate coating composition is applied to an undercoating film formed on a substrate, pre-dried at 100° C. for 30 minutes and then heat-cured at 145° C. for 30 minutes, the film thickness shrinkage percentage of the coating film must be 20% or less based on the film thickness of the coating film after pre-drying. If the film thickness shrinkage percentage exceeds 20%, it will be difficult to form a coating film with excellent smoothness by hiding fine irregularities on the surface of the undercoating film such as an electrodeposition coating film or the like. This results in lowered background hiding properties.

The aqueous intermediate coating composition preferably exhibits a film thickness shrinkage percentage of 18% or less, and more preferably 16% or less.

A film thickness shrinkage percentage of 20% or less can be achieved by, for example, using as the curing agent (B) a blocked isocyanate compound that forms urethane bonds by the addition reaction with the hydroxyl groups of the resin containing, hydroxyl and carboxyl groups (A) and has a cure rate slower than that of melamine resins, or by using as the curing agent (B) a highly alkyl-etherified melamine resin with a slow cure rate, or by increasing the pigment concentration of the coating composition.

The film thickness shrinkage percentage can be measured by, for example, measuring the three-dimensional shape of the coating film. A commercially available "EMS98-3D" (trade name, from Komosu, KK) can be used as a three-dimensional shape measuring system. More specifically, the aqueous intermediate coating composition of the invention, whose viscosity has been adjusted to about 40 seconds using Ford Cup No. 4 (at 20T), is air-sprayed onto the surface of a 300×450 mm electrocoated steel plate degreased with isopropanol, to yield a film thickness of 30 μm when cured, and then the coating film is pre-dried at 100° C. for 30 minutes. The film thickness of the coating film after pre-drying is used as a reference film thickness for measuring the film thickness shrinkage percentage. Prior to application, a portion of the electrocoated steel plate is covered with a masking tape, in order to leave that portion of the original electrocoated surface uncoated with the intermediate coating composition.

After the application of the intermediate coating composition, the masking tape is removed and the coating film is pre-dried at 100° C. for 30 minutes. Then, a region of about 10×10 mm including the boundary portion between the electrocoated surface and the intermediate coated surface is scanned using the above-described measuring system to measure the film thickness of the coating film of the intermediate coating composition after pre-drying (film thickness A, μm). After the film thickness A is measured, the intermediate coating film is cured by heating at 145° C. for 30 minutes, and then the film thickness of the same scanning region (film thickness B, μm) is similarly measured. The film thickness shrinkage percentage is calculated according to Equation (1):

$$\text{Film thickness shrinkage percentage (\%)} = [(\text{film thickness A} - \text{film thickness B})/\text{film thickness A}] \times 100 \quad (1)$$

Resin Containing Hydroxyl and Carboxyl Groups (A)

The resin containing hydroxyl and carboxyl groups (A) has a hydroxyl value of 100 to 200 mg KOH/g and an acid value of 20 to 50 mg KOH/g. Such a high hydroxyl value of the resin containing hydroxyl and carboxyl groups (A), which is a base resin, imparts excellent curing properties to the coating composition of the invention.

The type of resin is not limited as long as the resin (A) has a hydroxyl value and an acid value within the above-described ranges. Examples of resin types include polyester resins, acrylic resins, polyether resins, polycarbonate resins, polyurethane resins and the like. A resin containing hydroxyl and carboxyl groups, an acrylic resin containing hydroxyl and carboxyl groups, or the like is preferably used as resin (A).

These resins containing hydroxyl and carboxyl groups can be used singly or in combination.

Polyester Resin Containing Hydroxyl and Carboxyl Groups

A resin containing hydroxyl and carboxyl groups can be synthesized according to a common process, such as, for example, by the esterification reaction of a polybasic acid and a polyhydric alcohol.

The polybasic acid is a compound with two or more carboxyl groups per molecule. Examples of polybasic acids include phthalic acid, isophthalic acid, terephthalic acid, succinic acid, adipic acid, azelaic acid, sebacic acid, tetrahydrophtalic acid, hexahydrophthalic acid, maleic acid, fumaric acid, itaconic acid, trimellitic acid, pyromellitic acid, and the like. Anhydrides and the like of these polybasic acids can also be used.

The polyhydric alcohol is a compound with two or more hydroxyl groups per molecule. Examples of polyhydric alcohols include dials such as ethylene glycol, propylene glycol, 1,3-propanediol, 1,4-butanediol, 1,5-pentanediol, 1,6-hexanediol, 2,2-diethyl-1,3-propanediol, neopentyl glycol, 1,9-nonanediol, 1,4-cyclohexanediol, hydroxypivalic acid neopentyl glycol ester, 2-butyl-2-ethyl-1,3-propanediol, 3-methyl-1,5-pentanediol, 2,2,4-trimethylpentanediol, and hydrogenated bisphenol A; at least trihydric polyols such as trimethylolpropane, trimethylolethane, glycerol, and pentaerythritol; and hydroxycarboxyic acids such as 2,2-dimethylolpropionic acid, 2,2-dimethylolbutanoic acid, 2,2-dimethylolpentanoic acid, 2,2-dimethylolhexanoic acid, and 2,2-dimethyloloctanoic acid.

Alternatively, an α-olefin epoxide such as propylene oxide or butylene oxide, or a monoepoxy compound such as a glycidyl ester of a highly branched saturated fatty acid may be introduced into a polyester resin by reaction with the carboxyl groups in the polyester resin. A commercially available product can be used as a highly branched saturated fatty acid glycidyl ester. Examples of commercially available products include "Cardura E10" (trade name, a synthetic highly branched saturated fatty acid glycidyl ester, from Japan Epoxy Resins, Co., Ltd.).

The resin containing hydroxyl and carboxyl groups has a hydroxyl value of 100 to 200 mg KOH/g, and preferably 110 to 180 mg KOH/g. If the hydroxyl value is less than 100 mg KOH/g, the curing properties of the composition may become poor, whereas if the hydroxyl value exceeds 200 mg KOH/g, the water resistance of the coating film may deteriorate.

The resin containing hydroxyl and carboxyl groups also has an acid value of 20 to 50 mg KOH/g, and preferably 25 to 40 mg KOH/g. If the acid value is less than 20 mg KOH/g, the water dispersion stability of the coating composition of the invention may deteriorate, whereas if the acid value exceeds 50 mg KOH/g, the water resistance of the coating film may deteriorate.

The resin containing hydroxyl and carboxyl groups preferably has a number average molecular weight of about 250 to about 4,000, more preferably about 300 to about 3,500, and still more preferably about 300 to about 3,000, so as to satisfy the specified requirement for the molecular weight distribution of the resin component as a whole.

The resin containing hydroxyl and carboxyl groups preferably has a glass transition temperature of about −60 to about +30° C., and more preferably about −50 to about +20° C., so as to provide good coating film hardness and good surface smoothness of the coating film.

The resin containing hydroxyl and carboxyl groups may be a urethane-modified polyester resin.

Acrylic Resin Containing Hydroxyl and Carboxyl Groups

An acrylic resin containing hydroxyl and carboxyl groups can be synthesized according to a common process, such as, for example, by copolymerization of radically polymerizable monomers. A resin synthesized by a solution polymerization process is preferably used as an acrylic resin containing hydroxyl and carboxyl groups. Examples of organic solvents preferably used in this polymerization reaction include hydrophilic organic solvents such as propylene glycol-based, dipropylene glycol-based, and like solvents.

Known radically polymerizable monomers may be used as the radically polymerizable monomers, such as, for example, radically polymerizable monomers containing hydroxyl groups, radically polymerizable monomers containing carboxyl groups, and other radically polymerizable monomers.

The term "(meth)acrylate" as used herein means acrylate or methacrylate.

Examples of radically polymerizable monomers containing hydroxyl groups include 2-hydroxyethyl (meth)acrylate, hydroxypropyl (meth)acrylate, 4-hydroxybutyl (meth)acrylate, tetrahydrofurfuryl (meth)acrylate, ε-caprolactone-modified tetrahydrofurfuryl (meth)acrylate, ε-caprolactone-modified hydroxyethyl (meth)acrylate, polyethylene glycol mono(meth)acrylate, polypropylene glycol mono(meth)acrylate, 2-hydroxy-3-phenoxypropyl (meth)acrylate, 2-hydroxy-3-butoxypropyl (meth)acrylate, phthalic acid monohydroxyethyl (meth)acrylate, and the like.

Examples of radically polymerizable monomers containing carboxyl groups include acrylic acid, methacrylic acid, and the like.

Examples of other radically polymerizable monomers include styrene, methyl (meth)acrylate, ethyl (meth)acrylate, butyl (meth)acrylate, 2-ethylhexyl (meth)acrylate, lauryl (meth)acrylate, cyclohexyl (meth)acrylate, cyclohexenyl (meth)acrylate, phenoxyethyl (meth)acrylate, phenoxypolyethylene glycol (meth)acrylate, dicyclopentenyl (meth)acrylate, dicyclopentenyloxyethyl (meth)acrylate, isobornyl (meth)acrylate, benzyl (meth)acrylate, p-cumylphenol ethyleneoxide-modified (meth)acrylate, N-methylol (meta)acrylamide, N-butoxy (meta) acrylamide, acryloyl morpholine, dimethylaminoethyl (meth)acrylate, N-vinyl-2-pyrrolidone, γ-acryloxypropyl trimethoxysilane, and the like.

The acrylic resin containing hydroxyl and carboxyl groups has a hydroxyl value of 100 to 200 mg KOH/g, and preferably 110 to 180 mg KOH/g. If the hydroxyl value is less than 100 mg KOH/g, the curing properties of the composition of the invention may become poor, whereas if the hydroxyl value exceeds 200 mg KOH/g, the water resistance of the coating film may deteriorate.

The acrylic resin containing hydroxyl and carboxyl groups has an acid value of 20 to 50 mg KOH/g, and preferably 25 to 40 mg KOH/g. If the acid value is less than 20 mg KOH/g, the water dispersion stability of the coating composition of the invention may deteriorate, whereas if the acid value exceeds 50 mg KOH/g, the water resistance of the coating film may deteriorate.

The acrylic resin containing hydroxyl and carboxyl groups preferably has a number average molecular weight of about 1,000 to about 4,000, and more preferably about 1,000 to about 3,000, so as to satisfy the specified requirement for the molecular weight distribution of the resin component as a whole.

The acrylic resin containing hydroxyl and carboxyl groups preferably has a glass transition temperature of about −60 to about +30° C., and more preferably about −50 to about +20° C., so as to provide good coating film hardness and good surface smoothness of the coating film.

The acrylic resin containing hydroxyl and carboxyl groups may be a urethane-modified acrylic resin.

Urethane-Modified Polyester Resin (D) Having Both Hydroxyl and Blocked Isocyanate Groups Per Molecule The coating composition of the invention may further comprise, as a curable resin component, a urethane-modified polyester resin (D) with both hydroxyl and blocked isocyanate groups per molecule, so as to improve the chipping resistance of the coating film.

The urethane-modified polyester resin (D) with both hydroxyl and blocked isocyanate groups is a self-crosslinking resin, which can be synthesized by, for example, bonding a partially blocked polyisocyanate compound to a portion of the hydroxyl groups of a polyester resin containing hydroxyl groups by an urethanization reaction.

The polyester resin containing hydroxyl groups can be prepared by, for example, the esterification reaction of a polybasic acid and a polyhydric alcohol under the conditions of excess hydroxyl groups/in the presence of excess hydroxyl groups. Those exemplified above can be used as the polybasic acid and polyhydric alcohol.

The partially blocked polyisocyanate compound is a compound containing, per molecule, both an unblocked free isocyanate group and a blocked isocyanate group blocked with a blocking agent, which is obtained by, for example, blocking a portion of the free isocyanate groups of a polyisocyanate compound, using a blocking agent.

A polyisocyanate compound is a compound having two or more unblocked free isocyanate groups per molecule. Specific examples of polyisocyanate compounds include aliphatic diisocyanates such as hexamethylene diisocyanate, trimethylene diisocyanate, tetramethylene diisocyanate, pentamethylene diisocyanate, propylene diisocyanate, butylene diisocyanate, trimethylhexamethylene diisocyanate, dimer acid diisocyanate, lysine diisocyanate, and the like; alicyclic diisocyanates such as isophorone diisocyanate, methylenebis(cyclohexylisocyanate), methylcyclohexane diisocyanate, di(isocyanatomethyl)cyclohexane, cyclohexane diisocyanate, cyclopentane diisocyanate, and the like; aromatic diisocyanates such as xylylene diisocyanate, tolylene diisocyanate, diphenylmethane diisocyanate, naphthalene diisocyanate, toluidine diisocyanate, diphenylether diisocyanate, phenylene diisocyanate, biphenylene diisocyanate, dimethyl-biphenylene diisocyanate, isopropylidene bis(4-phenylisocyanate), and the like; polyisocyanate compounds having three or more isocyanate groups per molecule such as triphenylmethane triisocyanate, triisocyanatobenzene, triisocyanatotoluene, dimethyl diphenylmethane tetraisocyanate, and the like; urethane adducts obtained by reacting polyisocyanate compounds with the hydroxyl groups of polyols, such as ethylene glycol, propylene glycol, dimethylolpropionic acid, polyalkylene glycol, and trimethylolpropane, at a proportion such that excess isocyanate groups are present; and biuret adducts and isocyanurate ring adducts of diisocyanate compounds, such as hexamethylene diisocyanate, isophorone diisocyanate, tolylene diisocyanate, xylylene diisocyanate, diphenylmethane diisocyanate, methylenebis(cyclohexylisocyanate), and the like.

A blocking agent is a compound used to block free isocyanate groups. When the blocked isocyanate groups are heated to, for example, 100° C. or higher, and preferably 130° C. or higher, the blocking agent is dissociated from the free isocyanate groups, and the recovered free isocyanate groups can easily react with hydroxyl groups or the like.

Examples of blocking agents include phenol-based compounds such as phenol, cresol and the like; lactam-based compounds such as ε-caprolactam, δ-valerolactam, and the like; aliphatic alcohols such as methanol, ethanol, propyl alcohol, butyl alcohol, lauryl alcohol, and the like; ether-based compounds such as ethylene glycol monomethyl ether, ethylene glycol monoethyl ether, ethylene glycol monobutyl ether, diethylene glycol monoethyl ether, and the like; benzyl alcohol; glycolic acid esters such as methyl glycolate, ethyl glycolate, and the like; lactic acid esters such as lactic acid, methyl lactate, ethyl lactate, butyl lactate, and the like; alcohol compounds such as methylolurea, diacetone alcohol, and the like; oxime compounds such as aceto oxime, methylethyl ketoxime, diacetyl monoxime, benzophenone oxime, cyclohexane oxime, and the like; active methylene compounds such as diethyl malonate, ethyl acetoacetate, methyl acetoacetate, acetylacetone, and the like; mercaptan compounds such as butyl mercaptan, t-butyl mercaptan, hexyl mercaptan, t-dodecyl mercaptan, thiophenol, ethylthiophenol, and the like; acid amide compounds such as acetanilide, acetoanisidide, methacrylamide, acetic acid amide, benzamide, and the like; imide compounds such as phthalic acid imide, maleic acid imide, and the like; amine compounds such as diphenylamine, phenylnaphthylamine, carbazole, aniline, naphthylamine, butylamine, and the like; imidazole compounds such as imidazole, 2-ethylimidazole, and the like; urea compounds such as urea, thiourea, ethyleneurea, diphenylurea, and the like; carbamic acid ester compounds such as phenyl N-phenylcarbamate, and the like; imine compounds such as ethyleneimine, propyleneimine, and the like; sulfite compounds such as sodium bisulfite, potassium bisulfite, and the like; pyrazole compounds such as 3,5-dimethylpyrazole, 3-methylpyrazole, 4-nitro-3,5-dimethylpyrazole, 4-bromo-3,5-dimethylpyrazole, and the like.

The resin (D) can be synthesized by the urethanization reaction of a partially blocked polyisocyanate compound with a portion of the hydroxyl groups of a polyester resin containing hydroxyl groups. The urethanization reaction of a partially blocked polyisocyanate compound and a polyester resin containing hydroxyl groups can be performed under normal urethanization reaction conditions.

The partially blocked polyisocyanate compound can be synthesized by blocking a portion of the isocyanate groups of a polyisocyanate compound, using a blocking agent. The polyisocyanate compound can be reacted with a blocking agent under known conditions. The proportion of these two components is not limited as long as the resulting partially blocked polyisocyanate compound has at least one each of a free isocyanate group and a blocked isocyanate group per molecule.

The resin (D) can also be synthesized as follows: a portion of the hydroxyl groups of a polyester resin containing hydroxyl groups is reacted with a portion of the isocyanate groups of an unblocked polyisocyanate compound, and the remaining isocyanate groups of the resulting product are blocked using a blocking agent.

Alternatively, the resin (D) can also be synthesized as follows: a polyhydric alcohol, a partially blocked polyisocyanate compound, and an unblocked polyisocyanate compound are reacted in a proportion such that excess isocyanate groups are present, and the resulting product is reacted with a portion of the hydroxyl groups of a polyester resin containing hydroxyl groups. Any of the above-mentioned polyhydric alcohols can be used as a polyhydric alcohol.

The resin (D) preferably has a hydroxyl value of about 40 to about 150 mg KOH/g, and more preferably about 50 to about 130 mg KOH/g. If the hydroxyl value is less than 40 mg KOH/g, the curing properties of the composition may become poor, whereas if the hydroxyl value exceeds 150 mg KOH/g, the water resistance of the coating may deteriorate.

The resin (D) preferably has an acid value of about 20 to 60 mg KOH/g, and more preferably about 25 to about 50 mg KOH/g. If the acid value is less than 20 mg KOH/g, the water dispersion stability of the coating composition may deteriorate, whereas if the acid value exceeds 60 mg KOH/g, the water resistance of the coating film may deteriorate.

The resin (D) preferably has a number average molecular weight of about 250 to about 4,000, more preferably about 300 to about 3,000, and still more preferably about 300 to about 2,500, so as to satisfy the specified requirement for the molecular weight distribution of the resin component as a whole.

The resin (D) preferably has a glass transition temperature of about −60 to about +30° C., and more preferably about −50 to about +20° C., so as to provide good coating film hardness and good surface smoothness of the coating film.

When the coating composition uses, as a curable resin component, a urethane-modified polyester resin (D) with both hydroxyl and blocked isocyanate groups per molecule, preferably, the proportion of the resin (A) is 95 to 60% by weight and the proportion of the resin (D) is 5 to 40% by weight, and more preferably, the proportion of the resin (A) is 90 to 70% by weight and the proportion of the resin (D) is 10 to 30% by weight, based on 100% by weight of the total solids content of the resin containing hydroxyl and carboxyl groups (A) and the resin (D).

Curing Agent (B)

The curing agent (B) is at least one curing agent selected from the group consisting of melamine resins and blocked polyisocyanate compounds.

Melamine Resin

Specific examples of melamine resins include dimethylol melamine, trimethylolmelamine, tetramethylol melamine, pentamethylol melamine, hexamethylol melamine, and the like; alkyl-etherified products or condensates of these methylol melamines; condensates of alkyl-etherified methylol melamines; and the like. Methylol melamines can be alkyl-etherified by a known method, using, for example, monohydric alcohols such as methyl alcohol, ethyl alcohol, propyl alcohol, isopropyl alcohol, butyl alcohol, isobutyl alcohol, 2-ethylhexyl alcohol, and the like.

Commercially available products can be used as melamine resins. Examples of commercially available trade names include "Cymel 303", "Cymel 323", "Cymel 325", "Cymel 327", "Cymel 350", "Cymel 370", "Cymel 380", "Cymel 385", "Cymel 212", "Cymel 251", "Cymel 254", and "Mycoat 776", from Japan Cytec Industries, Inc.; "Resimene 735", "Resimene 740", "Resimene 741", "Resimene 745", "Resimene 746", and "Resimene 747", from Monsanto Co., Ltd.; "SUMIMAL M55", "SUMIMAL M30W", and "SUMIMAL M50W", from Sumitomo Chemical Co., Ltd.; "U-VAN 20SB", "U-VAN 20SE-60", and "U-VAN 28-60", from Mitsui Chemicals, Inc; and the like.

The melamine resin preferably has a mononuclear triazine content of 35% by weight or more, more preferably 40% by weight or more, and still more preferably 45% by weight or more, so as to satisfy the specified requirement for the molecular weight distribution of the curable resin component as a whole. The melamine resin is preferably a methyl-butyl mixed etherified melamine resin, which has a methoxy/butoxy molar ratio of from about 100/0 to about 60/40 mol %, i.e., a high methoxy ratio, to improve the storage stability of the coating composition, smoothness of the coating film, etc. More preferably, the methyl-butyl mixed etherified melamine resin has a methoxy/butoxy molar ratio of from about 100/0 to about 70/30 mol %.

An example of a particularly preferred melamine resin is a methyl-butyl mixed etherified melamine resin with a mononuclear triazine content of 35% by weight or more, and has a methoxy/butoxy molar ratio of 100/0 to 60/40 mol %. A commercially available product can be used as such a melamine resin. Examples of the trade names of commercially available products include "Cymel 325", "Cymel 327", "Cymel 350", "Cymel 212", "Cymel 251", "Mycoat 212", and "Mycoat 776", from Japan Cytec Industries, Inc.

The melamine resins can be used singly or in combination.

When a melamine resin is used as the curing agent (B), a sulfonic acid, such as para-toluenesulfonic acid, dodecylbenzenesulfonic acid, dinonylnaphthalenesulfonic acid, or the like; or a salt of any of these acids and an amine can be used as a catalyst.

Blocked Polyisocyanate Compound

A blocked polyisocyanate compound is a compound obtained by blocking all of the isocyanate groups of a polyisocyanate compound with two or more free isocyanate groups per molecule, using a blocking agent.

Any of the polyisocyanate compounds with two or more unblocked free isocyanate groups per molecule, as well as the compounds for blocking the free isocyanate groups, exemplified in the description of the urethane-modified polyester resin (D) above, can be used as a polyisocyanate compound and a blocking agent, respectively.

A hydroxycarboxylic acid with one or more hydroxyl groups and one or more carboxyl groups per molecule can also be used as a blocking agent. Examples of hydroxycarboxylic acids include hydroxypivalic acid, dimethylolpropionic acid, and the like. A blocked polyisocyanate compound blocked with a hydroxycarboxylic acid has one or more carboxyl groups originating from the starting hydroxycarboxylic acid, and is preferable in that it has good water dispersibility due to the hydrophilicity of the carboxyl groups.

The polyisocyanate compound can be reacted with the blocking agent according to a known method.

The blocked polyisocyanate compound preferably has a number average molecular weight of about 250 to about 4,000, more preferably about 300 to about 3,000, and still more preferably about 300 to about 2,500, so as to satisfy the specified requirement for the molecular weight distribution of the curable resin component as a whole.

One or more of the members selected from the group consisting of melamine resins and blocked polyisocyanate compounds can be used as the curing agent (B).

Both a melamine resin and a blocked polyisocyanate compound are preferably used as the curing agent (B), so as to impart good smoothness and chipping resistance to the coating film.

The reason for this can be guessed as follows. In an attempt to obtain sufficient curing properties for the composition using only a melamine resin, the shrinkage percentage of the coating film due to the dealcoholization reaction during curing increases, often resulting in a lower smoothness of the coating film. In particular, the use of only a fully-etherified melamine resin with a low molecular weight and good heat flow properties increases the amount of dealcoholization, often resulting in a lower smoothness of the coating film. When only a melamine resin is used, the temperature dependency of the curing reaction increases. Hence, when the curing temperature is low, the physical properties of the coating film, particularly such as water resistance, deteriorate; in contrast, when the curing temperature is high, the coating film hardness becomes excessively high, often resulting in lowered chipping resistance. On the other hand, when a blocked polyisocyanate compound is used alone, sufficient heat flow properties can be obtained up to the dissociation temperature of the blocking agent, but the curing properties of the composition often deteriorate. In view of the above, both a melamine resin and a blocked polyisocyanate compound are preferably used.

Preferably, in the coating composition, the proportion of the resin containing hydroxyl and carboxyl groups (A) is from about 85 to about 60% by weight, and the proportion of the curing agent (B) is from about 15 to about 40% by weight, based on 100% by weight of the total solids content of both components. If the proportion of the curing agent (B) is less than 15% by weight, the curing properties of the composition may deteriorate, whereas if the proportion is more than 40% by weight, the curing shrinkage may increase, resulting in lowered smoothness and chipping resistance of the coating film. More preferably, the proportion of the resin (A) is from about 80 to about 65% by weight, and the proportion of the curing agent (B) is from about 20 to about 35% by weight.

When the coating composition of the invention comprises, as a curing resin component, a urethane-modified polyester resin (D) with both hydroxyl and blocked isocyanate groups per molecule, along with components (A) and (B), the total blocked isocyanate group content of the component (B), which is a blocked polyisocyanate compound, and the urethane-modified polyester resin (D) with both hydroxyl and blocked isocyanate groups per molecule is preferably about 0.02 to about 0.8 mmol/g, based on the total content of the curable resin component, for improved smoothness of the coating film and improved curing properties of the composition. If the blocked isocyanate group content is less than 0.02 mmol/g, the curing properties may become poor, whereas if the content exceeds 0.8 mmol/g, the smoothness of the coating film may become poor. The blocked isocyanate group content is more preferably about 0.02 to about 0.7 mmol/g.

Preferably, in the coating composition, the proportion of the resin containing hydroxyl and carboxyl groups (A) and urethane-modified polyester resin (D) is from 85 to 60% by weight, and the proportion of the curing agent (B) is from 15 to 40% by weight, based on 100% by weight of the total solids content of components (A) and (D) as well as component (B). If the proportion of the component (B) is less than 15% by weight, the curing properties of the composition may deteriorate, whereas if the proportion is more than 40% by weight, the curing shrinkage may increase, resulting in lowered smoothness and chipping resistance of the coating film. More preferably, the proportion of the resin (A) and resin (D) is about 80 to about 65% by weight, and the proportion of the curing agent (B) is about 20 to about 35% by weight.

Flat Pigment Particles (C)

The coating composition of the invention comprises flat pigment particles (C) as an essential component. The flat pigment particles (C) are thin, flat pigments with a shape like scales, and specific examples include talc, aluminum flake, mica flake, and the like. Among these examples, talc is particularly preferred. The particles (C) preferably have a thickness of about 0.1 to about 2 µm, and more preferably about 0.2 to about 1.5 µm.

The particles (C) also preferably have a longitudinal dimension of about 1 to about 100 µm, and more preferably about 2 to about 20 µm.

The amount of the flat pigment particles (C) is about 2 to about 15 parts by weight based on 100 parts by weight of the curable resin component. When the particles are incorporated within this range, they are oriented in parallel with the surface of the coating film, thereby improving the smoothness and chipping resistance of the coating film. If the amount of the particles (C) is less than 2 parts by weight based on 100 parts by weight of the curable resin component, the smoothness and the chipping resistance of the coating film may become insufficient; whereas if the amount exceeds 15 parts by weight, the pigment may form an aggregate structure, resulting in lowered smoothness of the coating film. The amount of the particles (C) is preferably about 3 to about 10 parts by weight based on 100 parts by weight of the curable resin component.

Crosslinked Resin Fine Particles (E)

The coating composition of the invention can comprise crosslinked resin fine particles (E), as needed, to thereby improve the sag resistance. The crosslinked resin fine particles (E) are fine particles of an internally crosslinked resin, which are not involved in the curing reaction. The fine particles are insoluble in water or an organic solvent such as tetrahydrofuran, and can thus be sedimented by centrifugal separation or removed by filtration, without affecting the measurement of the molecular weight distribution.

Examples of crosslinked resin fine particles (E) include crosslinked acrylic resin particles, crosslinked urethane resin particles, and the like. The method for preparing the fine particles (E) is not limited. The particles may be obtained, for example, by the emulsion copolymerization of a radically polymerizable monomer mixture including divinyl monomers. The radically polymerizable monomers used in the resin (A) containing hydroxyl groups can be used as the radically polymerizable monomers used in the emulsion copolymerization. In particular, examples of divinyl monomers preferably used include 1,6-hexanediol diacrylate, divinylbenzene, allyl methacrylate, ethylene glycol di(meth)acrylate, and the like.

The crosslinked resin fine particles (E) preferably have an average particle size of 150 nm or less. A particle size exceeding 150 nm is not preferable because the smoothness of the coating film tends to deteriorate. More preferably, the fine particles (E) have an average particle size of about 80 to about 150 nm.

In this specification, the average particle size of the fine particles (E) herein is a value determined by measurement at 20° C. using a submicron particle size distribution analyzer after the fine particles are dispersed with deionized water. A commercially available submicron particle size distribution analyzer can be used. Examples of commercially available products include "COULTER N4" (trade name, from Beckman Coulter, Inc.).

The proportion of the crosslinked resin fine particles (E) is preferably about 1 to about 10 parts by weight relative to 100 parts by weight of the curable resin component. Within this range, the sag resistance of the composition can be improved. If the proportion of the fine particles (E) is less than 1 part by weight relative to 100 parts by weight of the curable resin component, the sag resistance cannot be improved sufficiently, whereas if the proportion exceeds 10 parts by weight, the smoothness of the coating film may deteriorate. The proportion of the fine particles (E) is more preferably from about 2 to about 7 parts by weight relative to 100 parts by weight of the curable resin component.

Pigment Not in the Form of Flat Particles

The coating composition of the invention may comprise, in addition to the flat pigment particles (C), a pigment not in the form of flat particles, as needed.

Known pigments used in coating compositions can be used as the pigment not in the form of flat particles. Examples of such pigments include color pigments such as titanium dioxide, zinc white, carbon black, copper phthalocyanine blue, Prussian blue, cobalt blue, azo pigments, phthalocyanine pigments, quinacridone pigments, isoindoline pigments, threne-based pigments, perylene pigments and the like; extender pigments such as clay, kaolin, baryta, barium sulfate, barium carbonate, calcium carbonate, silica, alumina white, and the like; luster pigments not having a flat shape; and the like.

The proportion of the pigment not in the form of flat particles is preferably from 2 to about 200 parts by weight, more preferably about 30 to about 170 parts by weight, and still more preferably about 50 to about 150 parts by weight, relative to 100 parts by weight of the curable resin component of the coating composition of the invention.

Other Components

The coating composition of the invention may further comprise, as needed, coating additives such as curing catalysts, rheology control agents, surface control agents, dispersants, anti-settling agents, organic solvents, defoaming agents, UV absorbents, light stabilizers, antioxidants, anti-rust agents, and the like. Examples of curing catalysts include acid catalysts, organic tin compounds, and the like. Examples of rheology control agents include thickeners, sag inhibitors, and the like.

Methods for the Preparation and Application of the Coating Composition of the Invention The coating composition of the invention can be prepared as follows. A curable resin component comprising the component (A), component (B), and optional component (D), as well as the component (C) are blended with optional components such as the component (E) and the like, and the resulting blend is mixed with water and dispersed. When the blend is mixed with water and dispersed, it is preferably neutralized with a neutralizer to improve the water dispersibility. When the blend is mixed with water and dispersed, an emulsifier can also be used together as needed to improve the dispersibility.

Examples of neutralizers include hydroxides of alkali metals or alkaline earth metals, such as sodium hydroxide, potassium hydroxide, lithium hydroxide, calcium hydroxide, barium hydroxide, and the like; ammonia; primary monoamine compounds such as ethylamine, propylamine, butylamine, benzylamine, monoethanolamine, neopentanolanlamine, 2-aminopropanol, 3-aminopropanol, and the like; secondary monoamine compounds such as diethylamine, diethanolamine, di-n-propanolamine, di-iso-propanolamine, N-methyl ethanolamine, N-ethyl ethanolamine, and the like; tertiary monoamine compounds such as dimethylethanolamine, trimethylamine, triethylamine, triisopropylamine, methyldiethanolamine, dimethylamino ethanol, and the like; and polyamine compounds such as diethylenetriamine, hydroxyethylaminoethylamine, ethylaminoethylamine, methylaminopropylamine, and the like. Among these examples, a primary monoamine compound, a secondary monoamine compound, a tertiary monoamine compound, or a polyamine compound is preferably used.

The amount of the neutralizer used can be suitably selected, but is preferably about 0.4 to about 1.2 by equivalent weight relative to the total amount of the acid groups of the curable resin component, so as to improve the dispersion stability. The amount of the neutralizer is more preferably from about 0.5 to about 1.0 by equivalent weight.

When applied, the aqueous intermediate coating composition of the invention is typically diluted with deionized water as needed to adjust the viscosity to, for example, preferably about 30 to about 120 seconds, and more preferably about 35 to about 90 seconds, as measured at 20° C. using, for example, Ford Cup No. 4. In this case, the solids content is preferably about 45 to about 65% by weight, and more preferably about 50 to about 60% by weight.

The aqueous intermediate coating composition of the invention, in general, preferably contains VOC in an amount of about 0 to about 300 g/l, and more preferably about 0 to about 150 g/l. The term "VOC" herein denotes volatile organic compounds classified into "very volatile organic compounds" and "volatile organic compounds" as defined by the World Health Organization (WHO).

The aqueous intermediate coating composition of the invention can be applied to form intermediate coating films on various substrates, using known methods, such as, for example, air spraying, airless spraying, rotary atomization coating, and the like. During the application, electrostatic application may also be performed. The coating film typically has a cured film thickness of about 15 to about 45 μm, and more preferably about 20 to about 40 μm. The coating film can typically be cured by heating at about 120 to about 170° C., and preferably about 130 to about 170, for about 10 to about 40 minutes.

Prior to heat-curing as described above, pre-drying is typically performed to volatilize the medium of the coating composition, such as water or an organic solvent, to dry the composition. Pre-drying is typically performed at a temperature of about 50 to about 100° C. for about 3 to about 30 minutes. Pre-drying preferably achieves a solids content of 90% by weight or more of the coating film.

Method for Forming a Multilayer Coating FILM

The method for forming a multilayer coating film of the invention is a method for forming a multilayer coating film by forming, on a substrate, an electrodeposition coating film, an intermediate coating film, and a topcoating film, the intermediate coating film being formed using the aqueous intermediate coating composition of the invention.

Examples of preferable substrates include various automotive bodies, such as automobiles, motorcycles, and the like. Substrates may also include metal materials that form such bodies, such as cold rolled steel sheets, galvanized steel sheets, zinc alloy-plated steel sheets, stainless steel sheets, tinned steel sheets and other steel sheets, aluminum sheets, aluminum alloy sheets and the like; plastic materials; and the like. Automotive bodies and metal materials whose metal surfaces have been treated using phosphate, chromate, or the like can also be used as substrates.

In the method for forming a multilayer coating film, an undercoating film of any of various electrodeposition coating compositions is first formed on a substrate. The electrodeposition coating composition is not limited, and may be a known cationic or anionic electrodeposition coating composition. A cationic electrodeposition coating composition, which has excellent corrosion resistance, is preferably used. Electrodeposition and heat-curing may be performed using a method and conditions generally employed to apply coating compositions to automobiles and the like by electrodeposition.

The aqueous intermediate coating composition of the invention is then applied to give a cured film thickness of typically about 15 to about 45 μm. After the application, pre-drying is typically performed to volatilize the medium of the coating composition, such as water or an organic solvent, to dry the composition. A topcoating film is then formed on the intermediate coating film uncured, or cured by heating at about 120 to about 170° C. for about 10 to about 40 minutes.

The topcoating film can be formed using any of various top coating compositions according to any of various known coating processes and curing processes. More specifically, one or more colored coating compositions, clear coating compositions, and the like can be used as top coating compositions to form a single-layer topcoating film or a multilayer topcoating film with two or more layers. The topcoat composition(s) may be either organic solvent- or water-based, but water-based top compositions are preferable to reduce the VOC content.

Examples of top coating compositions include coating compositions obtained by adding pigments and the like to thermosetting resin compositions used for coating of automobile bodies and the like. Examples of such thermosetting resin compositions include resin compositions comprising base resins (e.g., acrylic resins, polyester resins, urethane resins, and the like) with crosslinkable functional groups such as hydroxyl groups, and crosslinking agents such as melamine resins, polyisocyanate compounds, blocked polyisocyanate compounds, and the like; acid-epoxy crosslinking resin compositions comprising an acid-containing resin and an epoxy-containing resin as main components; and the like. Examples of pigments include coloring pigments, metallic pigments, extender pigments, and the like. The top coating composition may further comprise an anti-settling agent, a UV absorbent, and the like, as needed.

For application of the top coating composition, a one-coat, one-bake method that uses only a colored coating composition can be employed. A two-coat, one-bake method or a two-coat, two-bake method that uses a colored base coating composition and a clear coating composition can also be employed.

After the viscosity has been adjusted with an organic solvent and/or water to a suitable coating viscosity, the top coating composition can be applied by a known application method such as, for example, electrostatic application, airless spraying, or air spraying.

When the one-coat, one-bake method is used, a topcoat can be applied as follows. Subsequent to the application of a colored coating composition, the coat is pre-dried as needed at about 80° C. for about 10 minutes, and then the coat is cured by heating at a temperature of about 130 to about 180° C. for about 10 to about 40 minutes. The cured film thickness of the topcoating film, in general, is preferably from about 25 to about 50 μm, and more preferably from about 30 to about 45 μm.

When the two-coat, one-bake method is used, a topcoat can be applied as follows. A colored base coating composition is applied and pre-dried as needed, and then a clear coating composition is applied and pre-dried as needed. Both of the coats are then cured simultaneously by heating at a temperature of about 130 to about 180° C. for about 10 to about 40 minutes. When the colored base coating composition and/or clear coating composition are pre-dried, they can be pre-dried, for example, at about 80° C. for about 10 minutes. The cured film thickness of the colored base coat is preferably about 10 to about 25 μm, and more preferably about 12 to about 20 μm. The cured film thickness of the clear coating film is preferably about 25 to about 50 μm, and more preferably about 30 to about 45 μm.

A topcoat can also be applied by employing, for example, a three-coat, one-bake method; a three-coat, two-bake method; a three-coat, three-bake method; or a four-coat, two-bake method; using one or more colored base coating compositions and one or more clear coating compositions.

Effects of the Invention

The present invention achieves the following significant effects.

(1) The aqueous intermediate coating composition of the invention is capable of concealing fine irregularities on the surface of an undercoating film formed on a substrate such as an automobile body or the like, to thereby form a coating film with excellent smoothness.

It is believed that this effect is achieved for the following reasons: sufficient heat flow properties can be obtained in the heat-curing step by controlling the molecular weight distribution of the curable resin component of the coating composition within a specific range; and the background hiding properties can be improved by controlling the film thickness shrinkage percentage of the cured coating film to not more than a specific value based on the coating film after the pre-drying step. In addition, the coating composition of the invention exhibits improved smoothness of the coating film by incorporating therein a specific amount of flat pigment particles so that the pigment particles are oriented in parallel with the coating surface.

(2) The method for forming a multilayer coating film of the invention is capable of forming a multilayer coating comprising an undercoating film, an intermediate coating film, and a topcoating film, which exhibits excellent film performance such as smoothness, chipping resistance, water resistance, and the like.

(3) The invention is capable of effectively reducing emissions of volatile organic compounds (VOCs).

BEST MODE FOR CARRYING OUT THE INVENTION

The present invention is described below in greater detail, using preparation examples, examples, and comparative examples. The invention, however, is not limited by these examples. The units "part(s)" and "%" are both part(s) and % by weight. The film thickness of a coating film is the film thickness of the cured coating film, unless otherwise stated.

Preparation Example 1

Preparation of Polyester Resin Containing Hydroxyl and Carboxyl Groups

A four-necked flask having a heater, a stirrer, a thermometer, a reflux condenser and a water separator was charged with 28.0 parts of phthalic anhydride, 25.7 parts of adipic acid, 26.4 parts of neopentylglycol, and 22.9 parts of trimethylolpropane. The contents were then heated to 230° C. from 160° C. over a period of 3 hours, maintained at 230° C. and reacted until the acid value reached 3 mg KOH/g or less, while distilling off the resulting condensed water via the water separator.

6.69 parts of trimellitic anhydride was then added to the resulting product, and the mixture was neutralized by the addition of an equivalent weight of N-dimethylethanolamine to the carboxyl groups. Deionized water was then gradually added thereto, allowing the mixture to be dispersed in the water, thereby yielding a water dispersion of a polyester resin containing hydroxyl and carboxyl groups (A-1) with a solids content of 40%. The resulting polyester resin (A-1) had a hydroxyl value of 137 mg KOH/g, an acid value of 40 mg KOH/g, and a number average molecular weight of 2,000.

Preparation Examples 2 to 6

Using the raw materials shown in Table 1, polyester resins containing hydroxyl and carboxyl groups (A-2) to (A-6) were yielded in the same manner as in Preparation Example 1.

Table 1 shows the raw-material composition, the solids content of the resin water dispersion, and the resin properties of each of the polyester resins containing hydroxyl and carboxyl groups (A-1) to (A-6).

TABLE 1

|  |  | Preparation Examples | | | | | |
|---|---|---|---|---|---|---|---|
|  |  | 1 | 2 | 3 | 4 | 5 | 6 |
| Polyester Resin Name | | (A-1) | (A-2) | (A-3) | (A-4) | (A-5) | (A-6) |
| Raw-Material Composition (Parts) | Phthalic Anhydride | 28.0 | 21.2 | 20.0 | 20.5 | 22.8 | 22.0 |
| | Adipic Acid | 25.7 | 29.8 | 32.9 | 33.8 | 32.2 | 34.7 |
| | Neopentylglycol | 26.4 | 36.4 | 29.8 | 38.9 | 31.5 | 27.6 |
| | Trimethylolpropane | 22.9 | 17.5 | 22.8 | 12.6 | 19.3 | 22.0 |
| | Trimellitic Acid | 6.69 | 5.00 | 5.00 | 5.10 | 5.00 | 4.90 |
| Solids Content (%) | | 40 | 40 | 40 | 40 | 40 | 40 |
| Resin Properties | Hydroxyl Value (mg KOH/g) | 137 | 178 | 175 | 142 | 140 | 120 |
| | Acid Value (mg KOH/g) | 40 | 30 | 30 | 30 | 30 | 30 |
| | Number Average Molecular Weight | 2,000 | 1,200 | 1,500 | 1,500 | 1,900 | 4,200 |

Preparation Example 7

Preparation of Urethane-Modified Polyester Resin with Both Hydroxyl and Blocked Isocyanate Groups Per Molecule One hundred parts of a polyester resin, obtained by reacting 0.2 mol of trimethylolpropane, 0.8 mol of 1,6-hexanediol, 0.4 mol of cyclohexyl dicarboxylic acid, and 0.3 mol of adipic acid and then adding 0.05 mol of trimellitic anhydride to the reaction product, was reacted in methyl ethyl ketone with 30 parts of a polyurethane resin, obtained by reacting 2 mol of 4,4'-methylenebis(cyclohexylisocyanate) and 1 mol of dimethylolpropionic acid. A portion of the hydroxyl groups contained in 130 parts of the resulting reaction product was reacted with 10 parts of a half-blocked polyisocyanate compound obtained by reacting methyl ethyl ketone oxime and 4,4'-methylenebis (cyclohexylisocyanate) in an equimolar ratio. The solvent was then removed, and the reaction product was neutralized by the addition of an equivalent weight of dimethylethanolamine to the carboxyl groups. Deionized water was then added slowly, allowing the mixture to be dispersed in the water, thereby yielding a water dispersion of a urethane-modified polyester resin (D-1) with hydroxyl and blocked isocyanate groups per molecule with a solids content of 38%. The resulting urethane-modified polyester resin (D-1) had a hydroxyl value of 90 mg KOH/g, an acid value of 38 mg KOH/g, an NCO content of 0.9%, and a number average molecular weight of 2,000. The NCO content means the content (%) of blocked NCO groups per 100 parts by weight of the solids content of the resin.

Preparation Example 8

Preparation of Crosslinked Resin Fine Particles (E)

A four-necked flask with a stirrer, a thermometer, a reflux pipe, and a nitrogen inlet pipe was charged with 129 parts of deionized water and 0.8 parts of an anionic surfactant (trade name "Newcol 707SF", from Nippon Nyukazai Co., Ltd.; nonvolatile content: 30%) and purged with nitrogen, after which the contents were maintained at 82° C. while stirring. Emulsification polymerization was performed by first adding thereto a mixture obtained by dissolving 5 parts of the emulsified "monomer mixture" described below and 0.3 parts of ammonium persulfate in 3 parts of deionized water, and, after 20 minutes, adding dropwise a mixture obtained by dissolving the remaining "monomer mixture" and 0.3 parts of ammonium persulfate in 3 parts of deionized water, over a period of 4 hours. An emulsion of a crosslinked resin fine particles (E-1) with a solids content of 30% was thus obtained. The crosslinked resin fine particles (E-1) had an average particle size of 120 nm.

The "monomer mixture" was prepared by stirring and emulsifying a mixture of 100 parts of deionized water, 0.5 part of "Newcol 707SF", 20 parts of styrene, 35 parts of methyl methacrylate, 39 parts of n-butyl acrylate, 5 parts of 1,6-hexanediol diacrylate, and 1 part of acrylic acid.

Examples 1 to 8 and Comparative Examples 1 to 7

Preparation of Aqueous Intermediate Coating Composition

Each of the polyester resins obtained in Preparation Examples 1 to 6, the urethane-modified polyester resin with both hydroxyl and blocked isocyanate groups per molecule obtained in Example 7, a curing agent, flat pigment particles, and the crosslinked resin fine particles obtained in Preparation Example 8 were mixed in the proportions shown in Tables 2 and 3 below by stirring them using a rotary agitator (trade name "DESPA MH-L", from Asada Iron Works, Co., Ltd.), to yield aqueous intermediate coating compositions Nos. 1 to 15.

Before the flat pigment particles and other pigments were stirred and mixed with the other components, they were formed into a pigment dispersion paste by mixing each type of pigment particles with 15 parts of the polyester resin (A-1) obtained in Preparation Example 1, and dispersing the mixture in a small shaker (trade name "PAINT SHAKER", from Asada Iron Works, Co., Ltd.) for 30 minutes.

Deionized water and dimethylethanolamine were further added to each aqueous intermediate coating composition to adjust the pH to 8.5 and the viscosity to about 40 seconds at 20° C. using Ford Cup No. 4.

For each of the viscosity-adjusted aqueous intermediate coating compositions, the storage stability was tested, and the solids content and the VOC content were measured, in accordance with the following methods.

Storage stability: after storing each aqueous intermediate coating composition at 40° C. for 10 days, the storage stability was evaluated as follows based on the viscosity measured at 20° C. using Ford Cup No. 4.

a: A viscosity change of less than ±5 seconds; good storage stability.

b: A viscosity change of less than ±20 seconds; slightly poor storage stability.

c: A viscosity change of ±20 seconds or more; poor storage stability.

Solids content (%) of the coating composition: about 2 g of each viscosity-adjusted aqueous intermediate coating composition was measured into an aluminum plate with a diameter of 5 μm and spread well over the plate. The coating composition was then dried at 110° C. for 1 hour, after which the solids content (wt %) of the coating composition was calculated from the initial weight and the weight after drying.

VOC content (g/l): the VOC content of each viscosity-adjusted aqueous intermediate coating composition was calculated from the specific gravity (measured by the specific gravity cup method according to JIS K-5400 4.6.2.), the moisture content (measured using an automatic moisture meter (trade name "KF-100", the Karl Fischer method, from Mitsui Chemical, Inc.)), and the solids content of the coating composition, in accordance with Equation (2):

$$\text{VOC content } (g/l) = \{[100-(S+W)] \times \rho\}/[100-(W \times \rho)] \quad (2)$$

wherein S denotes the solids content (wt %), W denotes the moisture content (wt %), and ρ denotes the specific gravity (g/l), of the coating composition.

Tables 2 and 3 show, for each aqueous intermediate coating composition, the proportion of the components (solids content, parts), the molecular weight distribution of the curable resin component (MW denotes molecular weight), the blocked isocyanate group content based on the total content of the curable resin component, the evaluation of the storage stability, and the solids content and VOC content of the coating composition.

TABLE 2

| | | Examples | | | | | | | |
|---|---|---|---|---|---|---|---|---|---|
| | | 1 | 2 | 3 | 4 | 5 | 6 | 7 | 8 |
| Aqueous Intermediate Coating Composition No. | | 1 | 2 | 3 | 4 | 5 | 6 | 7 | 8 |
| Polyester Resin | (A-1) | 15 | 15 | 15 | 15 | 15 | 15 | 15 | 15 |
| | (A-2) | | | | 15 | 15 | | | |
| | (A-3) | 30 | 30 | 30 | | | 30 | 30 | 30 |
| | (A-4) | | | | | | | | |
| | (A-5) | 30 | 30 | 20 | 40 | 35 | 30 | 30 | 30 |
| | (A-6) | | | | | | | | |
| Curing Agent | (B-1) | | 15 | 15 | 20 | 20 | | | |
| | (B-2) | 25 | 5 | 5 | 5 | | 25 | | 25 |
| | (B-3) | | | | | | | 25 | |
| | (B-4) | | 5 | | 5 | | | | |
| Urethane-Modified Polyester Resin (D-1) | | | | 15 | | 15 | | | |
| Flat Pigment Particles (C-1) | | 10 | 10 | 10 | 10 | 10 | 13 | 10 | 10 |

TABLE 2-continued

|  |  | Examples | | | | | | | |
| --- | --- | --- | --- | --- | --- | --- | --- | --- | --- |
|  |  | 1 | 2 | 3 | 4 | 5 | 6 | 7 | 8 |
| Crosslinked Resin Fine Particles (E-1) | |  |  |  |  |  |  |  | 5 |
| Rutile Titanium Dioxide | | 80 | 80 | 80 | 80 | 80 | 80 | 80 | 80 |
| Carbon Black | | 1 | 1 | 1 | 1 | 1 | 1 | 1 | 1 |
| Molecular Weight Distribution (%) of Curable Resin component | MW: less than 1,000 | 35 | 36 | 32 | 47 | 36 | 35 | 35 | 35 |
|  | MW: over 100,000 | 8 | 8 | 8 | 3 | 4 | 8 | 8 | 8 |
| Blocked Isocyanate Content (mmol/g) | | 0 | 0.12 | 0.032 | 0.12 | 0.032 | 0 | 0 | 0 |
| Storage Stability | | a | a | a | a | a | a | a | a |
| Solids Content (%) | | 55 | 54 | 56 | 55 | 56 | 55 | 55 | 55 |
| VOC Content (g/l) | | 90 | 90 | 90 | 90 | 90 | 90 | 90 | 90 |

TABLE 3

|  |  | Comparative Examples | | | | | | |
| --- | --- | --- | --- | --- | --- | --- | --- | --- |
|  |  | 1 | 2 | 3 | 4 | 5 | 6 | 7 |
| Aqueous Intermediate Coating Composition No. | | 9 | 10 | 11 | 12 | 13 | 14 | 15 |
| Polyester Resin | (A-1) | 15 | 15 | 15 | 15 | 15 | 15 | 15 |
|  | (A-2) |  |  |  |  | 30 |  |  |
|  | (A-3) |  | 30 | 30 |  |  | 30 | 30 |
|  | (A-4) |  |  |  | 30 |  |  |  |
|  | (A-5) | 60 |  | 15 | 10 | 30 | 30 | 30 |
|  | (A-6) |  | 30 |  |  |  |  |  |
| Curing Agent | (B-1) |  |  | 10 | 45 |  |  |  |
|  | (B-2) | 25 | 25 |  |  | 25 | 25 | 25 |
|  | (B-3) |  |  |  |  |  |  |  |
|  | (B-4) |  |  |  |  |  |  |  |
| Urethane-Modified Polyester Resin (D-1) | |  |  | 30 |  |  |  |  |
| Flat Pigment Particles (C-1) | | 10 | 10 | 10 | 10 | 10 | 1 | 17 |
| Crosslinked Resin Fine Particles (E-1) | |  |  |  |  |  |  |  |
| Rutile Titanium Dioxide | | 80 | 80 | 80 | 80 | 80 | 80 | 80 |
| Carbon Black | | 1 | 1 | 1 | 1 | 1 | 1 | 1 |
| Molecular Weight Distribution (%) of Curable Resin component | MW: less than 1,000 | 27 | 30 | 25 | 33 | 53 | 35 | 35 |
|  | MW: over 100,000 | 9 | 12 | 8 | 8 | 2 | 8 | 8 |
| Blocked Isocyanate Content (mmol/g) | | 0 | 0 | 0.064 | 0 | 0 | 0 | 0 |
| Storage Stability | | a | a | a | b | a | a | b |
| Solids Content (%) | | 55 | 54 | 54 | 54 | 53 | 55 | 56 |
| VOC Content (g/l) | | 90 | 90 | 150 | 120 | 90 | 90 | 90 |

The curing agents (B-1) to (B-4), flat pigment particles (C-1), rutile titanium dioxide, and carbon black shown in Tables 2 and 3 denote the following.

Curing agent (B-1): an imino-containing methoxy-modified melamine resin (trade name "Cy 325", from Mitsui Cytec Ltd.; mononuclear triazine content: 40%; number average molecular weight: 1,000).

Curing agent (B-2): an imino-containing methoxy-modified melamine resin (trade name "Mycoat 776", from Mitsui Cytec Ltd.; mononuclear triazine content: 50%; number average molecular weight: 800).

Curing agent (B-3): an imino-containing methyl-butyl mixed etherified melamine resin (trade name "Mycoat 212", from Mitsui Cytec Ltd.; mononuclear triazine content: 50%; number average molecular weight: 1,000; methoxy/butoxy groups=75/25 mol %).

Curing agent (B-4): hexamethylene diisocyanate in which the isocyanate groups are blocked with methylethyl ketoxime (trade name "VPLS2310", from Sumitomo Bayer Urethane Co., Ltd.; number average molecular weight 1,000).

Flat pigment particles (C-1): talc (trade name "MICRO ACE S-3", from Nippon Talc, Co., Ltd.; thickness: 0.3 to 0.9 µm; diameter: 5 to 10 µm).

Rutile titanium dioxide: trade name "JR-806" (from Tayca Corporation).

Carbon black: trade name "Carbon MA-100" (from Mitsubishi Chemical Corporation).

Preparation of Test Plates

Test plates were prepared in the following manner for each of the aqueous intermediate coating compositions obtained in Examples 1 to 8 and Comparative Examples 1 to 7.

A cationic electrodeposition coating composition (trade name "Elecron GT-10", from Kansai Paint Co., Ltd.) was applied by electrodeposition to a cold rolled steel plate that has been treated using a zinc-phosphate treating agent (trade name "Palbond #3020", from Nihon Parkerizing Co., Ltd.) to a film thickness of 20 µm, and then heat-cured at 170° C. for 30 minutes to form an electrodeposition coating film.

Each of the aqueous intermediate coating compositions Nos. 1 to 15 obtained in the Examples and Comparative Examples was applied to the electrodeposition coating film to a film thickness of 30 µm. Each of the applied coats was allowed to stand at room temperature for 3 minutes, pre-dried at 80° C. for 3 minutes, and then cured by heating at 145° C. for 30 minutes.

An acrylic/melamine resin water-based coating composition for automobiles (trade name "metallic base coat WBC 710T #1E7", from Kansai Paint Co., Ltd.) was applied to the intermediate coating film to a film thickness of 15 µm, allowed to stand at room temperature for 3 minutes and preheated at 80° C. for 3 minutes. An organic solvent-based clear coating composition (trade name "KINO #1200 TW", from Kansai Paint Co., Ltd., an acid/epoxy curing acrylic resin clear coating composition) was applied to the coating film of the uncured base coating composition to a film thickness of 35 μm and allowed to stand at room temperature for 7 minutes. Both coating films were then cured simultaneously by heating at 140° C. for 30 minutes to thereby obtain test plates.

Performance Test

The following performance tests were conducted on each test plate obtained above.

Smoothness: the smoothness of the coated surface was measured using "Wave Scan" (trade name, from BYK Gardner). Wave Scan measures the Long Wave value (LW) and the Short Wave value (SW). The "horizontal" shows the measured values obtained when the coated test plate was pre-dried and heat-cured in a horizontal position at an angle of 0° with respect to the horizontal plane; and the "vertical" shows the measured values obtained when the coated test plate was pre-dried and heat-cured in a vertical position at an angle of 90° with respect to the horizontal plane.

The Long Wave value is an index of the amplitude of the surface roughness at a wavelength of about 600 to 1,000 μm, which can evaluate large amplitudes such as orange peel and the like on the coated surface. The Short Wave value is an index of the amplitude of the surface roughness at a wavelength of about 100 to 600 μm, which can evaluate small amplitudes on the coated surface.

For each Wave Scan value, the lower the measured value, the higher the smoothness of the coated surface. In general, the smoothness is satisfactory when the Wave Scan value is less than 15.

Water resistance: the test plate was allowed to stand in a thermostatic room at 20° C. for 24 hours, immersed in warm water of 80° C. for 5 hours and then gradually cooled from 80° C. to room temperature while remaining immersed. The test plate was then drawn from the water, and the surface condition of the coating film was evaluated according to the following criteria:

a: Good gloss and excellent water resistance.
b: Poor gloss and slightly poor water resistance.
c: Poor gloss, white cloudy coating surface, and poor water resistance.

Chipping resistance: the test plate was mounted on the sample holder of a chipping resistance test apparatus (trade name "JA-400 Model", a gravel chipping test instrument from Suga Test Instruments Co., Ltd.), and 50 g of crushed granite with grain size No. 7 was sprayed onto the coating surface at −20° C. and at a compressed air flow of 0.392 MPa (4 kgf/cm$^2$). The coating film was visually observed for the degree of defects thus formed, and the chipping resistance was evaluated according to the following criteria:

a: Defects are 2 mm or less in diameter, and the electrocoated surface is not exposed.
b: Defects are at least 2 mm and less than 4 mm in diameter, and the electrocoated surface is exposed.
c: Defects are 4 mm or more in diameter, and the base steel plate is exposed.

Thickness shrinkage percentage (%): coated plates were prepared separately for testing. The surface of an electrocoated steel plate (dimensions: 300 mm (length)×450 mm (width)×0.8 mm (thickness)) was degreased with isopropanol. A 12×300 mm region of the surface of the electrocoated steel plate was taped with masking tape. Each aqueous intermediate coating composition, whose viscosity had been adjusted to 40 seconds using Ford Cup No. 4 (20° C.), was then air-sprayed to the plate to a film thickness of 30 μm. After removing the masking tape, the coated plate was allowed to stand for 3 minutes and then pre-dried at 100° C. for 30 minutes.

A region of about 10 mm×10 mm including the boundary portion between the electrocoated surface and the intermediate coated surface was then scanned using a three-dimensional shape measuring system (trade name "EMS98-3D", from Komos, KK) to measure the film thickness (film thickness A, μm) of the coating film of the coating composition after pre-drying. After measuring the film thickness A, the intermediate coating film was cured by heating at 145° C. for 30 minutes, and then the film thickness of the same scanning region (film thickness B, μm) was measured in the same manner. The film thickness shrinkage percentage was calculated according to Equation (1):

$$\text{Film thickness shrinkage percentage (\%)}=[(\text{film thickness A}-\text{film thickness B})/\text{film thickness A}]\times 100 \quad (1)$$

Solids content (%) after pre-drying: as in the film thickness shrinkage measurement, the intermediate coating composition was applied and pre-dried at 100° C. for 30 minutes, after which a selected portion of the coating film of the intermediate coating composition was quickly scraped off for use as a sample of the coating film after pre-drying. About 2 g of the sample was measured into an aluminum foil cup with a diameter of about 5 cm and spread well throughout the cup. The applied sample was then dried at 110° C. for 1 hour, and the solids content (%) of the coating composition after pre-drying was calculated from the initial weight and the weight after drying at 110° C. for 1 hour.

Sag Limit Film Thickness (μm):

A cationic electrodeposition coating composition (trade name "Elecron GT-10", from Kansai Paint Co., Ltd.) was applied by electrodeposition to a cold rolled steel plate treated using a zinc phosphate treating agent (trade name "Palbond #3020" from Nihon Parkerizing Co., Ltd.) to a film thickness of about 20 μm and cured by heating at 170° C. for 30 minutes to form an electrodeposition coat. A row of 21 punches with 5 mm diameters and 2 cm intervals was provided in the portion 3 cm from the edge of this electrocoated plate.

Each intermediate coating composition was air-sprayed to the electrodeposition coating film with these punches while gradually varying the film thickness to give a gradient of 20 to 50 μm. The coated plate was pre-dried and heat-cured in a vertical position. The periphery of the punches in the coated plate was examined for a position in which a sag of about 1 mm was observed in the coating film. At the same time, with the coated plate positioned horizontally, the film thickness of the coated plate after pre-drying and heat-curing was measured in the same position, and the measured film thickness was defined as the sag limit film thickness (μm).

Tables 4 and 5 show the results of the above-described performance tests.

TABLE 4

|  |  | Examples | | | | | | | |
|---|---|---|---|---|---|---|---|---|---|
|  |  | 1 | 2 | 3 | 4 | 5 | 6 | 7 | 8 |
| Intermediate Coating Composition No. | | 1 | 2 | 3 | 4 | 5 | 6 | 7 | 8 |
| Smoothness | Horizontal LW | 2.6 | 2.9 | 3.5 | 2.4 | 2.3 | 2.9 | 2.9 | 3.0 |
|  | Horizontal SW | 9.8 | 10.6 | 11.1 | 9.2 | 9.0 | 10.3 | 10.6 | 10.3 |

TABLE 4-continued

|  | Examples | | | | | | | |
| --- | --- | --- | --- | --- | --- | --- | --- | --- |
|  | 1 | 2 | 3 | 4 | 5 | 6 | 7 | 8 |
| Vertical LW | 5.8 | 6.2 | 6.5 | 5.2 | 5.3 | 6.1 | 6.3 | 6.3 |
| Vertical SW | 12.8 | 13.1 | 13.3 | 12.2 | 12.4 | 13.2 | 13.3 | 13.0 |
| Water Resistance | a | a | a | a | a | a | a | a |
| Chipping resistance | a | a | a | a | a | a | a | a |
| Film Thickness Shrinkage Percentage (%) | 15 | 16 | 18 | 16 | 16 | 15 | 15 | 15 |
| Solids Content (%) after Pre-drying | 97 | 96 | 97 | 96 | 97 | 97 | 97 | 97 |
| Sag Limit Film Thickness (μm) | 35 | 35 | 35 | 33 | 32 | 35 | 35 | 39 |

TABLE 5

|  | Comparative Examples | | | | | | |
| --- | --- | --- | --- | --- | --- | --- | --- |
|  | 1 | 2 | 3 | 4 | 5 | 6 | 7 |
| Intermediate Coating Composition No. | 9 | 10 | 11 | 12 | 13 | 14 | 15 |
| Smoothness Horizontal LW | 5.7 | 6.1 | 5.1 | 4.2 | 3.3 | 2.7 | 6.5 |
| Horizontal SW | 17.4 | 17.9 | 13.8 | 23.2 | 11.3 | 12.2 | 20.5 |
| Vertical LW | 8.2 | 8.5 | 7.9 | 6.7 | 6.1 | 5.6 | 8.8 |
| Vertical SW | 19.5 | 20.2 | 19.1 | 25.2 | 19.2 | 18.2 | 20.8 |
| Water Resistance | a | a | a | a | c | a | a |
| Chipping resistance | a | a | b | b | a | c | b |
| Film Thickness Shrinkage Percentage (%) | 18 | 18 | 17 | 26 | 18 | 18 | 18 |
| Solids Content (%) after Pre-drying | 97 | 97 | 96 | 97 | 97 | 97 | 97 |
| Sag Limit Film Thickness (μm) | 34 | 36 | 35 | 32 | 31 | 33 | 36 |

The invention claimed is:

1. An aqueous intermediate coating composition comprising:
   (A) a resin containing hydroxyl and carboxyl groups with a hydroxyl value of 100 to 200 mg KOH/g and an acid value of 20 to 50 mg KOH/g;
   (B) at least one curing agent selected from the group consisting of melamine resins and blocked polyisocyanate compounds; and
   (C) flat pigment particles;
   the molecular weight distribution of a curable resin component comprising component (A) and component (B) including from 30 to 50% by weight of a component with a molecular weight of less than 1,000, and 10% by weight or less of a component with a molecular weight exceeding 100,000;
   the proportion of component (C) being from 2 to 15 parts by weight based on 100 parts by weight of the curable resin component; and
   when the intermediate coating composition is applied to an undercoating film, pre-dried at 100° C. for 30 minutes and then heat-cured at 145° C. for 30 minutes, the film thickness shrinkage percentage of the cured coating film being 20% or less based on the film thickness of the coating film after pre-drying.

2. An aqueous intermediate coating composition according to claim 1, wherein the resin containing hydroxyl and carboxyl groups (A) is at least one resin selected from the group consisting of polyester resins containing hydroxyl and carboxyl groups and acrylic resins containing hydroxyl and carboxyl groups.

3. An aqueous intermediate coating composition according to claim 1, wherein the curing agent (B) is a mixture of a melamine resin and a blocked polyisocyanate compound.

4. An aqueous intermediate coating composition according to claim 1, wherein the curing agent (B) is a methyl-butyl mixed etherified melamine resin having a mononuclear triazine content of 35% by weight or more, and having a methoxy/butoxy molar ratio of from 100/0 to 60/40 mol%.

5. An aqueous intermediate coating composition according to claim 1, wherein the proportion of the resin containing hydroxyl and carboxyl groups (A) is from 80 to 65% by weight, and the proportion of the curing agent (B) is from 20 to 35% by weight, based on 100% by weight of the total solids content of both components.

6. An aqueous intermediate coating composition according to claim 1, further comprising, as a curable resin component, a urethane-modified polyester resin (D) with both hydroxyl and blocked isocynate groups per molecule.

7. An aqueous intermediate coating composition according to claim 6, wherein the total blocked isocyanate group content of the curing agent (B), which is a blocked polyisocyanate compound, and the urethane-modified polyester resin (D) with both hydroxyl and blocked isocynate groups per molecule is from 0.02 to 0.8 mmol/g, based on the total content of the curable resin component.

8. An aqueous intermediate coating composition according to claim 6, wherein the proportion of the resin containing hydroxyl and carboxyl groups (A) and the urethane-modified polyester resin (D) is from 85 to 60% by weight, and the proportion of the curing agent B is from 15 to 40% by weight, based on 100% by weight of the total solids content of components (A) and (D) as well as component (B).

9. An aqueous intermediate coating composition according to claim 1, further comprising crosslinked resin particles (E) with an average particle size of 150 nm or less.

10. An aqueous intermediate coating composition according to claim 9, wherein the proportion of the crosslinked resin particles (E) is from 1 to 10 parts by weight based on 100 parts by weight of the curable resin component.

11. An aqueous intermediate coating composition according to claim 1, further comprising a pigment not in the form of flat pigment particles.

12. A method for forming a multilayer coating film by forming on a substrate an undercoating film, an intermediate coating film, and a topcoating film, the intermediate coating film being formed using the aqueous intermediate coating composition defined in claim 1.

13. A method according to claim 12, wherein the substrate is an automobile body.

* * * * *